Nov. 23, 1937.     W. H. RICHARDS     2,099,706
CONTROL DEVICE
Filed Nov. 9, 1935     3 Sheets-Sheet 2
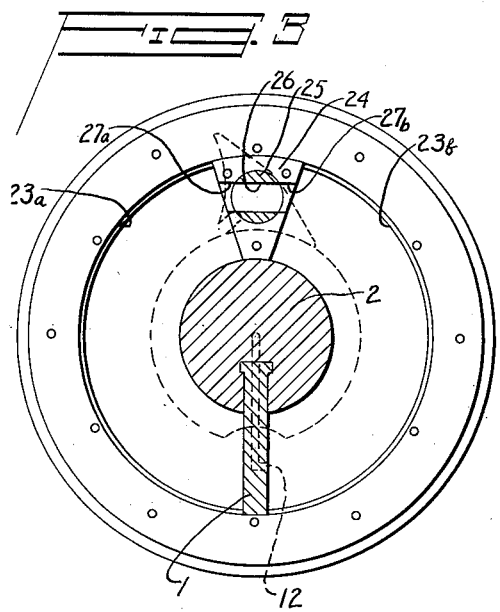
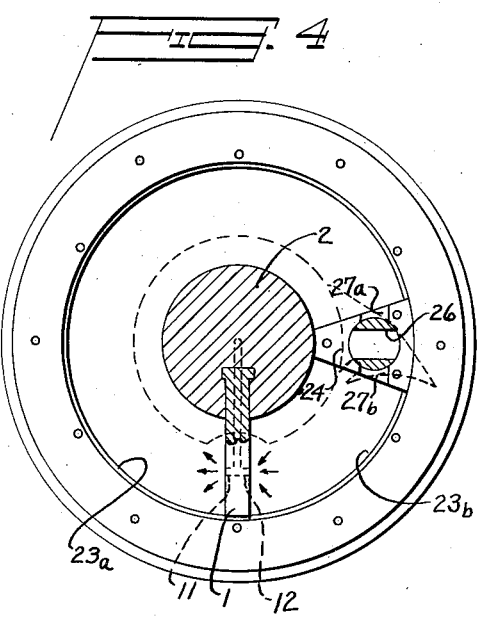
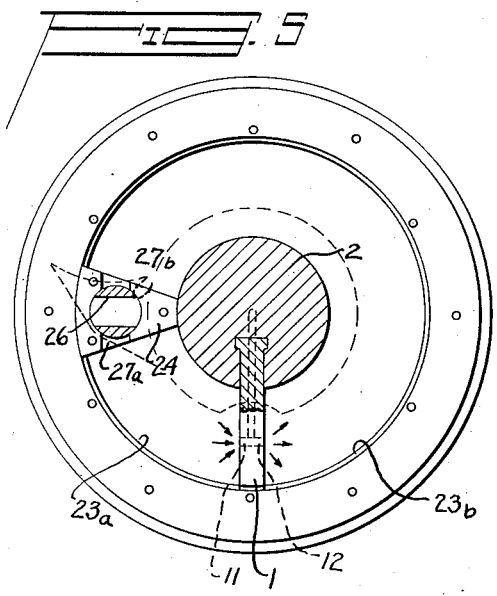
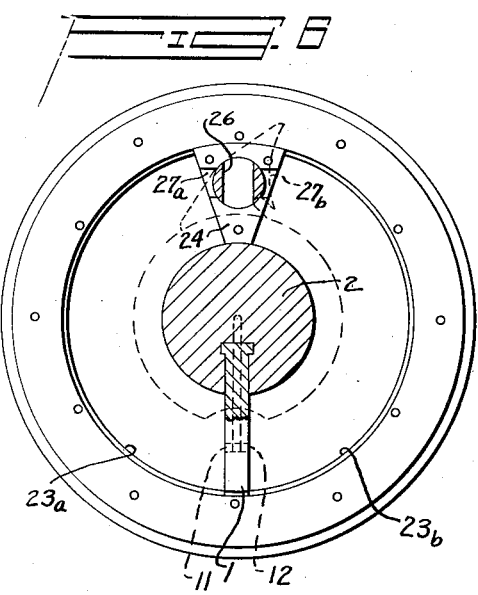
INVENTOR
WILLIAM H. RICHARDS
BY
ATTORNEYS Nov. 23, 1937.    W. H. RICHARDS    2,099,706
CONTROL DEVICE
Filed Nov. 9, 1935    3 Sheets-Sheet 3
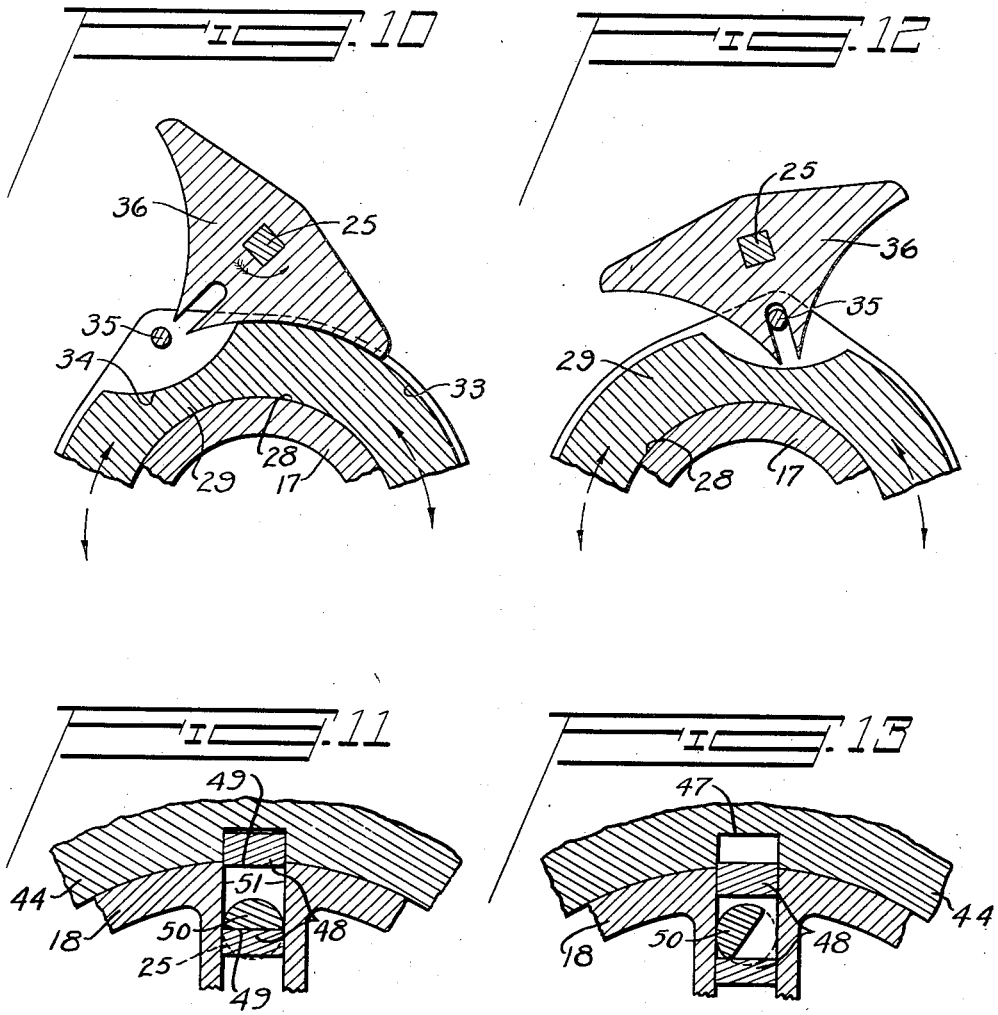
INVENTOR
WILLIAM H. RICHARDS Patented Nov. 23, 1937

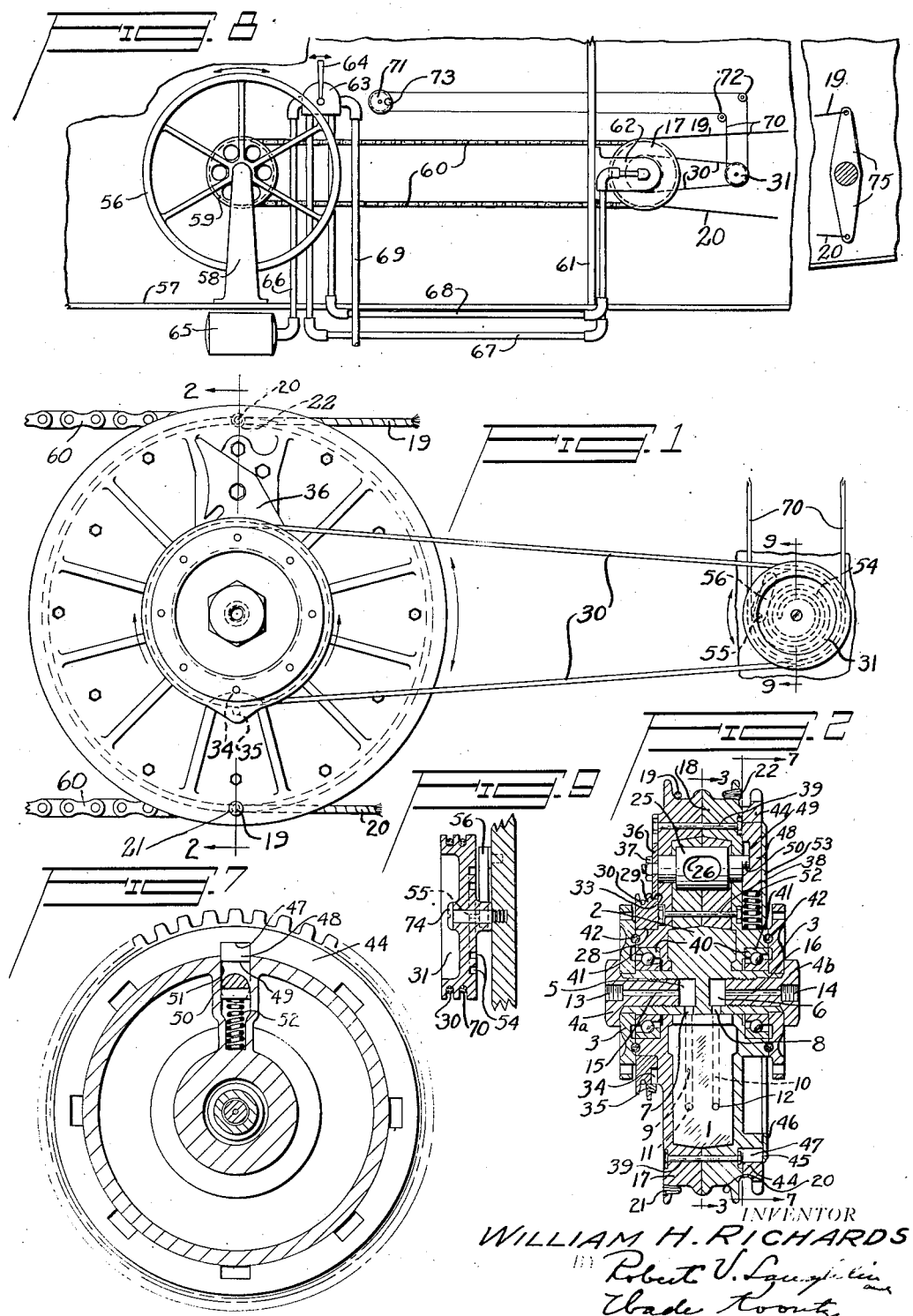

2,099,706

UNITED STATES PATENT OFFICE 2,099,706

CONTROL DEVICE

William H. Richards, Dayton, Ohio

Application November 9, 1935, Serial No. 49,051

6 Claims. (Cl. 121—38)

(Granted under the act of March 3, 1883, as amended April 30, 1928; 370 O. G. 757)

The invention described herein may be manufactured and used by or for the Government for governmental purposes, without the payment to me of any royalty thereon.

It is an object of my invention to interpose between an oscillatory member and a manually operated control wheel or lever adapted to be connected therewith means for selectively disengaging manual actuation and providing servo motor actuation of said oscillatory member.

It is a further object of my invention that disengagement of one driving means be accompanied by automatic engagement of the other driving means.

With the foregoing and other objects in view, which will appear as the description proceeds, the invention consists of certain new and novel improvements in control devices which will be hereinafter more fully illustrated and described in the accompanying drawings and more particularly pointed out in the appended claims.

Referring to the drawings, in which numerals of like character designate similar parts throughout the several claims:

Fig. 1 is a side view of the servo motor portion of my invention;

Fig. 2 is a sectional view taken on the lines 2—2 of Fig. 1;

Fig. 3 is a sectional view taken on the lines 3—3 of Fig. 2;

Fig. 4 shows valve adjustment for clockwise rotation of the servo motor;

Fig. 5 shows valve adjustment for counter-clockwise rotation of the servo motor;

Fig. 6 is the same as Fig. 3, except for valve closure;

Fig. 7 is a sectional view taken on the lines 7—7 of Fig. 2;

Fig. 8 shows one application of my invention to lighter-than-air craft;

Fig. 9 is an enlarged sectional view taken on the lines 9—9 of Fig. 1;

Fig. 10 shows the Geneva mechanism about to be actuated;

Fig. 11 shows the latch position corresponding to the segment positioning of Fig. 10;

Fig. 12 shows the Geneva mechanism in process of actuation, and

Fig. 13 shows the latch position corresponding to the segment positioning of Fig. 12.

In Figs. 2 through 6, a stationary vane 1 is dovetailed to the central portion of a support 2. The support 2 is fixed to any desired structure by means of mounting plates 3 which are, in turn, secured to the support 2 by means of retaining screws 4a and 4b. The aforementioned parts remain stationary at all times. Holes 5 and 6, extending beyond the tapped portions of the support 2, communicate with holes 7 and 8, respectively, located normal to the base of the vane 1. Longitudinally disposed holes 9 and 10 in the vane 1 align respectively with the aforesaid holes 7 and 8. As viewed in Fig. 2, a hole 11 from the far side of the vane 1 communicates with the inner extremity of the hole 9, while a hole 12 from the near side of the vane 1 communicates with a similar extremity of the hole 10. Thus, fluid passing through tapped hole 13 and hole 15 of the retaining screw 4a is discharged from the far side of the vane 1, while fluid passing through tapped hole 14 and hole 16 of the retaining screw 4b is discharged from the near side of the vane 1. As all of the aforesaid parts and passageways remain stationary, it is obvious that tapped holes 13 and 14 may be connected to a fluid pressure system provided with suitable control means.

The vane 1 and support 2 are encased in a housing of split drum form composed of portions 17 and 18. One extremity of a flexible cable 19 is secured in a tapered hole 21 provided in the outer flange of the drum portion 17, following which the cable 19 is given a one-half clockwise wrap, as shown in Figs. 1, 2, and 8. Similarly, an extremity of a flexible cable 20 is secured in a tapered hole 22 provided in the outer flange of the drum portion 18, following which the cable 20 is given a one-half counter-clockwise wrap, as shown in Figs. 1, 2, and 8. When secured together, the portions 17 and 18 provide an unbroken cavity through which the vane 1 can endlessly sweep and for that reason it is necessary to provide a header plate 24 which, in combination with the vane 1, divides the aforesaid cavity into the chambers 23a and 23b shown in Fig. 3. The header plate 24 is provided with a by-pass valve 25 having a port 26 adapted to align, when "open", with ports 27a and 27b provided in the header plate 24. In the "open" position of parts shown in Figs. 1, 2, 3 and 7, the header plate 24 functions solely as a stop for the vane 1, as fluid within the vane cavity can readily by-pass from chamber 23a to chamber 23b, or vice versa, with manual counter-clockwise or clockwise rotation of the drum portions 17 and 18.

Fluid operation of my invention is accomplished through remote control of the by-pass valve 25, in combination with a similarly controlled source of fluid supply. The former control is illustrated in Figs. 1, 2, and 8. Referring to Figs. 2 and 10, the drum portion 17 is provided with a journal boss 28 for mounting a Geneva pulley 29. The pulley 29 is actuated by means of flexible cables 30 and 70, remotely located auxiliary pulleys 31 and 71, and guide pulleys 72. The inner face of the Geneva pulley 29 is provided with a bearing surface 33, a cut-out 34 and an actuating pin 35 for operation of a Geneva segment 36 fixed to a threaded extremity of the by-pass valve 25 by means of a nut 37 and locking pin (not shown). Following assembly of those parts secured together by means of bolts 38 and 39, ball bearings 40 are installed between recesses 41 of drum portions 17 and 18 and the journal portions of the support 2, after which mounting plates 3 are slipped loosely over the journaled ends of the drum portions 17 and 18. Prior final fixity of retaining screws 4a and 4b, annular packings 42 are installed in recesses provided between the mounting plates 3 and the journaled ends of the drum portions 17 and 18.

Let it be assumed that the mounting plates 3, the auxiliary pulleys 31 and 71, and other parts associated therewith, are mounted as shown in Fig. 8. Let it be further assumed that the auxiliary pulleys 31 and 71 have previously been subjected to maximum counter-clockwise rotation by means of a control handle 73, such that the parts dispositions of the split drum housing are those shown in Figures 1, 2, 3, 10 and 11. If the cable groove diameters of the pulleys 29 and 31 are of a two-to-one ratio, respectively, just slightly less than one clockwise rotation of the auxiliary pulley 31 causes the actuating pin 35 of the Geneva pulley 29 to rotate from the position indicated in Fig. 1 to the new position shown in Fig. 10; i. e., the aforesaid pin is about to enter the slotted aperture in the Geneva segment 36. If clockwise rotation of the Geneva pulley 29 be carried an additional fifteen to twenty degrees, past the position of Fig. 10, to that shown in Fig. 12, it is readily seen that the by-pass valve 25 of Fig. 2 is caused to rotate approximately three-fourths of its full possible counter-clockwise movement. Thus, in the many and varied positions which the Geneva mechanism may assume to either side of the arbitrary central position shown in Fig. 1, as long as the actuating pin 35 is moving towards and lies within close proximity of the open end of the Geneva segment slot, slight clockwise movement of the pulley 29 will "close" and slight counter-clockwise movement will "open" the by-pass valve 25. Conversely, if the actuating pin 35 is fixed in a position more than forty degrees to either side of the position shown in Fig. 1, rotation of the drum portions 17 and 18 will accomplish inverse "opening" and "closing" of the by-pass valve 25. Two clockwise rotations of the auxiliary pulley 31 will cause the Geneva segment 36 to assume the dotted position shown in Figs. 4, 5 and 6, otherwise the part showing of Fig. 1 will remain unaltered. It should be noted in Fig. 6 that ports 27a and 27b are sealed by the side walls of the port 26 and that there is no communication between the chambers 23a and 23b. Let it be still further assumed that the control regulating the source of fluid supply utilized in connection with my invention be set such that there is ingress of fluid into the chamber 23a from the hole 11 and egress of fluid from chamber 23b into the hole 12, as shown in Fig. 4. Since the vane 1 and the support 2 never change from the positions shown in Figs. 2 through 6, the drum portion of my invention will immediately undergo clockwise rotation, the extent of which is dependent upon fluid increase in the chamber 23a and fluid decrease in the chamber 23b. As shown in Fig. 4, the volume of the chamber 23a is greater than that of the chamber 23b. If the aforesaid control be reversed such that there is ingress of fluid into the chamber 23b from the hole 12 and egress of fluid from the chamber 23a into the hole 11, then the volume of the chamber 23b is greater than that of the chamber 23a, as shown in Fig. 5. Thus it will be seen that I have provided a servo motor with an angular operating range in excess of three hundred degrees. Due to flexible cable linkage with the mast 75, angular movement of the mast member may be readily increased or decreased by decreasing or increasing the lengths of the arms to which the outer two extremities of the flexible cables 19 and 20 are secured.

A further novel feature of my invention consists in the provision for rapid interchange of fluid for manual and vice versa control of the drum portions 17 and 18. Manual operation of my invention is accomplished through remote control of an idling member in the form of a sprocket 44 mounted upon a journal boss 43 of the drum portion 18. The sprocket 44 is secured to the drum portion 18 by means of a retaining ring 45 and screws 46 and is further provided upon its inner surface with a plurality of notches 47 adapted to be engaged by head of a bolt 48. The bolt 48 has a notch 49 adapted to cooperate with cam portion 50 of the by-pass valve 25 and is slidably mounted in a recess 51 provided in the drum portion 18, as shown in Figs. 2, 7, 11 and 13. The recess 51 is narrowed at its lower extremity (see Fig. 7) for housing a spring 52 adapted to hold the lowermost surface of the notch 49 in constant contact with the outer surface of the cam portion 50. A plate 53, secured to the outer surface of the drum 18, prevents misalignment of the spring 52 and bolt 48 during engagement and disengagement with one or another of the notches 47. In the parts dispositions of Figs. 1, 2, 3, 7, 10 and 11, the bolt 48 is projected fully within the notch 47 such that the sprocket 44 cannot be rotated without corresponding rotation of the drum portions 17 and 18. It should also be noted that the port 26 is "open", thus removing from a fluid operation standpoint the head plate 24 inserted between the chambers 23a and 23b.

It should be further noted that the sections of Figs. 10 and 11 are viewed from the same side and with identical parts dispositions as the side and parts dispositions of Fig. 1.

The parts dispositions of Figs. 12 and 13 are identical. It is thus readily apparent that complete counter-clockwise movement of the Geneva segment 36 will effect complete removal of the bolt 48 from the notch 47 provided in the sprocket 44, thus freeing the latter from driving engagement with the drum portions 18 and 19.

In order that remote operation of the Geneva segment 36 may be reduced to maximum simplicity, the back face of the auxiliary pulley 31 has been provided with a two-turn spiral groove 54, as shown in Figs. 1 and 9. The groove 54 is adapted to be operatively engaged by a pin 55 projecting from a link 56 pivotally mounted at its upper extremity to the structure supporting the auxiliary pulley 31. It will be noted in Fig. 1 that further counter-clockwise rotation of the auxiliary pulley 31 is prevented by seating of the pin 55 against the outer end extremity of the groove 54. This arrangement is selected to permit only clockwise rotation of the Geneva pulley 29, when the actuating pin 35 and aperture opening in the Geneva segment 36 are in the attitudes shown in Fig. 1. Both of the aforesaid pulleys remain stationary, except when it is desired to "open" or "close" the by-pass 25 of Fig. 2. Slightly over one complete clockwise turn of the pulley 31, from the initial position shown in Fig. 1, will cause the segment positioning of Fig. 12. Two complete clockwise turns of the pulley 31 will cause seating of the pin 55 against the inner end extremity of the groove 54, whereupon the actuating pin 35 will again have obtained the positioning of Fig. 1, but the aperture opening in the Geneva segment 36 will slope to the right instead of the left. Thereafter the auxiliary pulley 31 can be turned in a counter-clockwise direction only and that for the sole purpose of "reopening" the closed by-pass valve positionings of Figs. 4, 5, and 6. The pulley 31 is mounted on a bearing screw 74 and is remotely controlled by means of an auxiliary pulley 71, a control handle 73, cables 70 and guide pulleys 72. As has been stated before, these parts remain stationary, except when it is desired to open or close the by-pass valve 25.

One of the many uses to which my invention may be applied is shown in Fig. 8. A lighter-than-air elevator control wheel 56 is secured to a control room floor 57 by means of a pedestal 58. The control wheel 56 is provided with a sprocket 59 and a chain 60 operatively connected to the sprocket 44 of the drum portion 18. The mounting plates 3 of my invention are secured to the aft side of a control room partition 61 by means of a bracket 62. Flexible cables 19 and 20 extend aft from the drum portions 17 and 18 for interconnection with elevator masts 75. The auxiliary pulley 71 and control handle 73 are placed immediately aft of the control wheel 56, within easy reach of the operator thereof.

For fluid operation of my invention I have provided a control valve 63 actuated by a control handle 64, a source of fluid supply 65 and conventional piping connections 66 through 69. Fluid under pressure is supplied to the control valve 63 by means of connections 66. The by-pass valve 25 is first closed by means of the control handle 73. Thereafter through forward movement (counter-clockwise, as viewed in Fig. 8) of the control handle 64, fluid is permitted to escape through connections 67 into the retaining screw 4b and from thence into the chamber 23b. At the same time fluid from the chamber 23a is permitted to escape from the retaining screw 4a through connections 68 and 69 to the outer atmosphere. The aforementioned fluid passage induces steady counter-clockwise movement of the drum portions 17 and 18 until the control handle 64 is brought back to the neutral position shown in Fig. 8. Obviously, backward movement of the control handle 64 induces clockwise movement of the drum portions 17 and 18. If, during either of the foregoing movements, predetermined counter-clockwise movement of the auxiliary pulley 31 is effected by means of the control handle, fluid control of my invention is rendered ineffective and manual operation of the drum portions 17 and 18 will be required through the medium of the control wheel 56. Further, I do not wish to limit my fluid control to a "gas" controlled system. It is at once apparent that the connections 66 and 69 are equally applicable to interconnection with a "liquid" controlled system caused to ebb or flow through proper control interconnection with the control handle 64.

I claim:
1. In a control system comprising, a member to be oscillated, a bi-chambered servo motor having a portion of its housing formed for rotatable connection to said member for fluid actuation thereof, an idling member journaled to said rotatable housing, and a control wheel directly connected to said idling member for manual actuation thereof, means selectively fixing the idling member to the servo housing and further means operatively connected to said first mentioned means to permit free fluid flow between the bi-chambers of said servo motor during manual actuation of said oscillated member.

2. In a control system comprising, a member to be oscillated, a bi-chambered servo motor having a portion of its housing formed for rotatable connection to said member for fluid actuation thereof, an idling member journaled to said rotatable housing, and a control wheel directly connected to said idling member for manual actuation thereof, means selectively fixing the idling member to the servo housing and further means to permit free fluid flow between the bi-chambers of said servo motor, said former means being so connected to said latter means as to automatically assure free inter-chamber fluid flow during manual actuation of said oscillated member.

3. In a control system comprising, a member to be oscillated, a bi-chambered servo motor having a rotating housing portion operatively connected to said oscillated member including an idling member journaled to said rotating housing portion, and a control wheel operatively connected to said idling member, means for selectively fixing or releasing said member rotationally with respect to said rotating housing and further means connected therewith to correspondingly provide for or prevent free fluid flow between the bi-chambers of said servo motor during corresponding manual or fluid pressure actuation of said oscillated member.

4. In a control system comprising, a member to be oscillated, a bi-chambered servo motor having a rotating housing portion operatively connected to said oscillated member including an idling member journaled to said rotating housing portion, and a control wheel operatively connected to said idling member, means for selectively releasing said idling member rotationally with respect to said housing and further means to prevent free fluid flow between the bi-chambers of said servo motor, said former means being so connected to said latter means as to automatically prevent free inter-chamber fluid flow during fluid actuation of said oscillated member.

5. A servo motor comprising, a stationary portion operatively connected with a controlled source of fluid supply, a rotating housing incasing said stationary portion including a header plate forming with said stationary portion two housing chambers, said housing having its periphery adapted for drum cable winding, an idling sprocket journaled adjacent to the cable winding portion of said rotating housing, means for selectively fixing or releasing said idling sprocket rotationally with respect to said rotating housing, and further means associated with said header plate to permit or prevent inter-chamber fluid flow, said former means being so connected to said latter means that sprocket fixity simultaneously provides inter-chamber fluid flow while releasing of said idling sprocket simultaneously prevents inter-chamber fluid flow.

6. A servo motor comprising, a stationary portion operatively connected with a controlled source of fluid supply, a rotating housing incasing said stationary portion including a header plate forming with said stationary portion two housing chambers, said housing having its maximum diameter adapted for drum cable winding, an idling sprocket journaled adjacent to the cable winding portion of said rotating housing, means for selectively fixing or releasing said sprocket rotationally with respect to said rotating housing, and further means associated with said header plate to permit or prevent inter-chamber fluid flow, said former means being so connected to said latter means that sprocket fixity simultaneously and automatically provides inter-chamber fluid flow while releasing of said idling sprocket simultaneously and automatically prevents inter-chamber fluid flow.

WILLIAM H. RICHARDS.